United States Patent [19]
Kopich

[11] Patent Number: 4,527,822
[45] Date of Patent: Jul. 9, 1985

[54] SUNROOF LATCH

[75] Inventor: Leonard F. Kopich, Madison Heights, Mich.

[73] Assignee: General Motors Corporation, Detroit, Mich.

[21] Appl. No.: 521,678

[22] Filed: Aug. 10, 1983

[51] Int. Cl.³ .................. B65D 45/30; B65D 45/32
[52] U.S. Cl. ........................ 292/257; 24/607; 24/646; 292/19; 411/60; 411/76
[58] Field of Search ............... 292/257, 19, 83, 304; 411/57, 60, 76; 24/606–608, 643, 644, 646, 647, 650; 49/465

[56] References Cited

U.S. PATENT DOCUMENTS

| | | |
|---|---|---|
| 2,556,062 | 6/1951 | Buehrig . |
| 2,642,768 | 6/1953 | Ogburn ........................ 411/60 X |
| 3,106,759 | 10/1963 | Kytta ........................... 411/503 X |
| 3,378,219 | 4/1968 | Biesecker ...................... 411/57 X |
| 3,406,431 | 10/1968 | Armstrong et al. ............... 411/57 |
| 3,659,442 | 5/1972 | Cellini et al. ................... 292/19 X |
| 4,007,516 | 2/1977 | Coules .......................... 411/57 X |
| 4,113,303 | 9/1978 | Yench .......................... 49/465 X |
| 4,193,618 | 3/1980 | Lee et al. . |
| 4,195,866 | 4/1980 | Tundo et al. . |
| 4,426,098 | 1/1984 | Kalmanson .................... 292/257 |

FOREIGN PATENT DOCUMENTS 902985  1/1945  France ........................... 292/19

Primary Examiner—Gary L. Smith
Assistant Examiner—Russell W. Illich
Attorney, Agent, or Firm—Charles E. Leahy

[57] ABSTRACT

A latch mechanism for retaining a sunroof closure panel in a vehicle body roof opening includes a pin projecting from the closure panel and received within a bore of a receptacle mounted on the vehicle body. The pin is bifurcated by a central slot defining a pair of legs. A latch lever is pivoted within a transverse bore in the receptacle and carries a cam member which is received within the slot of the pin and straddled by the legs when the closure panel is lowered into its closed position. Rotation of the latch lever and the cam member forcibly spreads the pin legs into engagement with the bore of the receptacle to latch the sunroof closure panel in the closed position. The pin slot and the cam member may have mating tapers by which an adjustment of the transverse position of the cam member will adjust the extent of forcible spread of the legs to adjust for wear and for manufacturing or assembly variations.

1 Claim, 5 Drawing Figures

SUNROOF LATCH

The invention relates to a latch mechanism and more particularly to an improved latch mechanism for securing a removable roof closure panel in a vehicle body roof opening.

BACKGROUND OF THE INVENTION

It is well-known in automotive vehicle bodies to provide a roof opening having a removable closure panel. One such well-known removable roof structure is shown in U.S. Pat. No. 2,256,062 issued to G. M. Buehrig on June 5, 1951, and includes a central spine or backbone which extends from the fixed rearward roof portion to the windshield header to define an opening over the driver and an opening over the front seat passenger.

In other vehicles, the roof opening is a rectangular opening in the center of the roof panel so that the roof rail structure extends between the fixed rearward roof portion and the windshield header.

Such removable roof closure panels are held in their closed position by latching systems such as toggle clamps or latch bolts.

In still other vehicles the roof opening extends fully from the fixed rearward roof portion to the windshield header and from one door to the other without any central spine or roof rail structure. In these vehicle body constructions where there is no central spine or roof rail extending between the windshield header and the fixed rear roof portion, it would be desirable to provide a new latching system by which the roof closure panel is more rigidly connected to the windshield header and fixed rear roof portion.

SUMMARY OF THE INVENTION

The present invention provides a new and improved latch mechanism for a vehicle body removable roof closure.

A latch mechanism for retaining a sunroof closure panel in a vehicle body roof opening includes a pin projecting from the closure panel and received within a bore of a receptacle mounted on the vehicle body. The pin is bifurcated by a central slot defining a pair of legs. A latch lever is pivoted within a transverse bore in the receptacle and carries a cam member which is received within the slot of the pin and straddled by the legs when the closure panel is lowered into its closed position. Rotation of the latch lever and the cam member forcibly spreads the pin legs into engagement with the bore of the receptacle to latch the sunroof closure panel in the closed position. The pin slot and the cam member may have mating tapers by which an adjustment of the transverse position of the cam member will adjust the extent of forcible spread of the legs to adjust for wear and for manufacturing or assembly variations.

BRIEF SUMMARY OF THE DRAWINGS

These and other objects, features and advantages of the invention will become apparent upon consideration of the specification and the appended drawings in which.

DESCRIPTION OF THE PREFERRED EMBODIMENT

Figure 1:
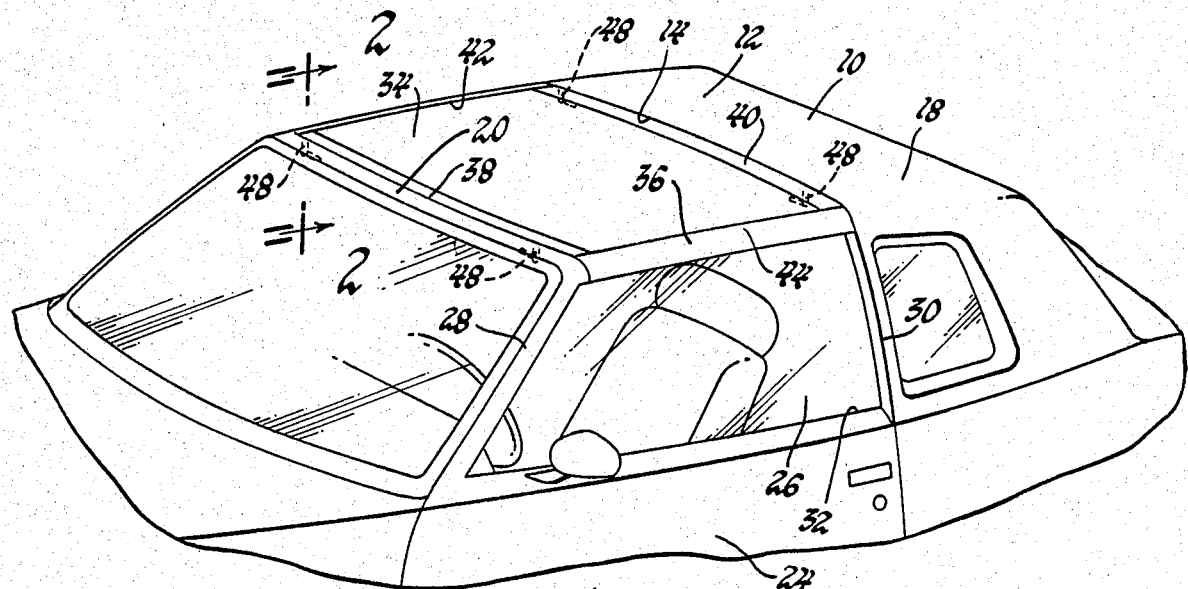
FIG. 1 is a perspective view of a motor vehicle body having a removable roof closure panel.

Referring to FIG. 1, it is seen that a vehicle body 10 includes a roof structure 12 having a roof opening 14 located above the driver and passenger seats. The roof opening 14 is defined by a fixed rearward roof portion 18 and a windshield header 20. The driver door 24 has a window 26 which cooperates with the windshield pillar 28 and rear pillar 30 to define a window opening 32 which communicates with the roof opening 14 so that the occupants enjoy open space both above and to the side.

A removable roof closure panel 34 is provided to close the roof opening 14. The closure panel 34 includes a perimeter frame 36 defined by a front rail 38 and a rear rail 40 connected by side rails 42 and 44. The outer surface of the closure panel 34 is provided by a transparent or translucent glass panel which overlies and is attached to the perimeter frame 36. Alternatively, the outer surface may be an opaque plastic or metal panel.

Figure 2:
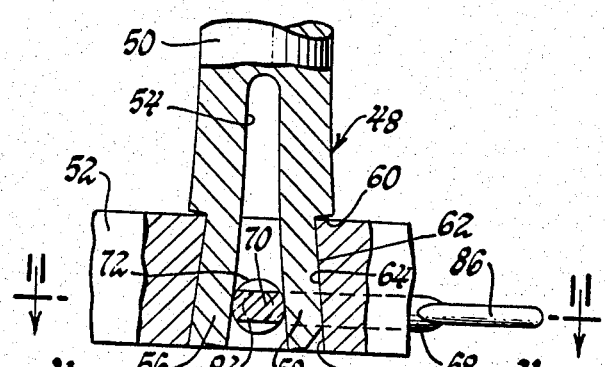
FIG. 2 is a sectional view taken in the direction of arrows 2—2 of FIG. 1, showing the removable closure panel latched in the closed position.
Figure 3:
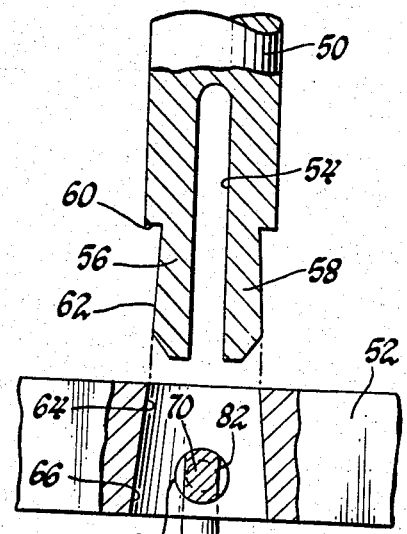
FIG. 3 is a view similar to FIG. 2 but showing the closure panel in the unlatched position.
Figure 4:
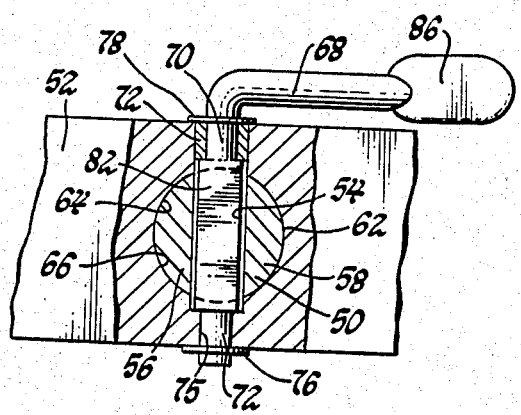
FIG. 4 is a sectional view taken in the direction of arrows 4—4 of FIG. 2.

A plurality of latches 48 act between the perimeter frame 36 and the windshield header 20 and fixed roof portion 18. As seen in FIGS. 2, 3 and 4, a typical latch 48 includes a pin 50 mounted on the front rail 38 of the perimeter frame 36 and a receptacle 52 mounted on the windshield header 20. The pin 50 is preferably circular in cross section as shown in FIG. 4, and has a central slot 54 which bifurcates the pin 50 to define a pair of legs 56 and 58. The outer surfaces of the legs 56 and 58 are machined to provide a shoulder 60 and a conical flared surface 62.

The receptacle 52 has a bore 64 with a conical flared surface 66 which mates with the conical surface 62 of the pin legs 56 and 58 when the legs are spread apart.

As best seen in FIGS. 3 and 4, a latch lever 68 is an L-shaped rod including a shank portion 70 which carries a bushing 72 and is deformed along a central portion of its length to define an oval shaped cam 82. The end 74 or shank portion 70 and the bushing 72 carried by the shank portion are rotatably journalled within a stepped bore 75 drilled through the receptacle 52 and transversely bisecting the bore 64. The shank portion 70 and bushing 72 are held in place by retaining rings 76 and 78.

As best seen in FIGS. 2 and 3, the shank portion 70 of the latch lever 68 bisects the bore 64 so that the shank portion 70 and the cam 82 are received within the slot 54 of the pin 50 and straddled by the legs 56 and 58 when the closure panel 34 is lowered from the open position of FIG. 3 to the closed position of FIG. 2. The shoulder 60 of the pin 50 engages with the receptacle 52 to limit the downward movement of the pin 50 into the receptacle 52. Then, rotation of the latch lever 68 by gripping the handle 86 at the end thereof rotates the cam member 82 from the position of FIG. 3 to the position of FIG. 2. Accordingly, the oval-shaped cam member 82 engages against the pin legs 56 and 58 and forcibly spreads the legs outwardly into latching engagement with the bore 64 of the receptacle 52.

Referring to FIG. 2, it is seen that the cam actuated engagement between the outward flare of the pin flared surface 62 and the outward flare of the receptacle flared surface 66 provide a substantial interference against withdrawal of the pin 50 from the receptacle 52. Furthermore, in addition to the frictional force between the pin and receptacle, any upward movement of the pin 50 merely induces the engaging flared surfaces to contract the legs 56 and 58 toward each other but such contraction is blocked by the cam member 82.

As best seen in FIG. 4, the spread apart radially expanded position of the pin legs 56 and 58 is such that the conical outer surface 62 thereof is in total surface-to-surface contact with the conical flared surface 66 of the receptacle bore 64. In order to obtain this full surface contact, it will be appreciated that the conical flared surface 62 must be cut on the pin 50 while the legs 56 and 58 are radially expanded to their forced spread apart positions of FIG. 2. Thus, the pin 50 is preferably manufactured by first broaching or otherwise cutting the slot 54 into the pin, then spreading the legs 56 and 58 apart to approximate their latched position in the receptacle 52, and then lathe turning or otherwise cutting the conical flared surface 62 onto the surface of the pin 50. Accordingly, the pin 50 has a normal state in which the legs 56 and 58 are radially contracted so that the pin 50 will fit within the receptacle 52 when the closure panel 34 is lowered into the closed position.

Figure 5:
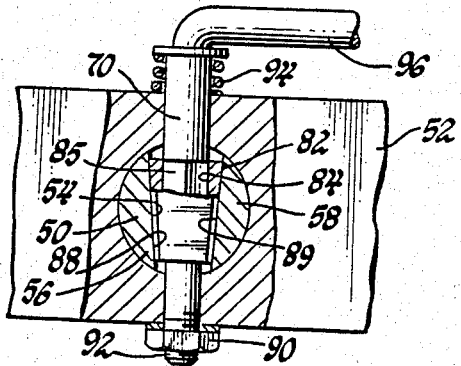
FIG. 5 is a view similar to FIG. 4 but showing an alternative embodiment of the latch.

Referring to FIG. 5, there is shown an alternative embodiment of the invention in which the cam member 82 is oval-shaped in cross section but is also tapered in longitudinal section along its length as shown in FIG. 5. The cam member has a square bore 84 which nonrotatably engages with a square central portion 85 of the shank portion 70. The slot 54 of the pin 50 is defined by angular walls 88 and 89 which are angled to match the taper of the cam member 82. The shank portion 70 is retained by a nut 90 threadedly engaged on a threaded end portion 92 of the shank. A coil compression spring 94 is seated between the receptacle 52 and a handle 96 swaged or otherwise fixedly attached onto the other end of shank portion 70.

Accordingly, as seen in FIG. 5, loosening and tightening of the nut 90 on the threaded end portion 92 of shank portion 70 will adjust the location of the tapered cam member 82 transversely within the receptacle 52 which will in turn adjust the extent of forcible spread of the pin legs 56 and 58 upon rotation of the cam member 82. In this way, any variation in the manufacturing process or wear of the parts can be readily adjusted.

Although the preferred arrangement of the invention is shown in the drawings and described herein, it will be understood that other modifications may be made within the scope of the appended claim. For example, although the pin 50 and receptacle 52 are shown herein as having mating circular cross sections and conical flared outer surfaces, which resist withdrawal of the pin 50 from the receptacle 52, the pin and receptacle could have noncircular cross sections and/or the outer surfaces could be right cylindrical or flanged instead of conically flared to provide a substantial locking relationship between the pin and bore of the receptacle.

Thus, is it seen that the invention provides a new and useful high strength latch mechanism for retaining a removable roof closure panel upon a vehicle body.

The embodiments of the invention in which an exclusive property or privilege is claimed are defined as follows:

1. A latch mechanism for securing a removable roof closure panel in a vehicle body roof opening comprising:

a pin projecting from the closure panel and bifurcated by a central slot defining angularly disposed slot walls dividing the pin into a pair of legs;

a receptacle mounted on the vehicle body and having a first bore adapted to receive the pin when the roof closure panel is lowered into a closed position with respect to the roof opening and a second bore transversely bisecting the first bore;

a latch lever pivotally mounted within the second bore and having a shank portion received within a slot of the bifurcated pin and straddled by the legs when the closure panel is lowered into the closed position with respect to the roof panel;

cam means carried by the latch lever shank portion and being tapered along the length so that the cam means contacts with the angularly disposed slot walls of the pin, said cam means being effective upon rotation of the latch lever to forcibly spread the legs into latching engagement with the first bore of the receptacle to latch the roof closure panel in the closed position; and adjusting means acting between the receptacle and the latch lever to enable transverse adjustment of the cam member to determine the extent of forcible spread of the legs into engagement with the first bore.

* * * * *